United States Patent [19]
Lai et al.

[11] Patent Number: 6,027,372
[45] Date of Patent: Feb. 22, 2000

[54] ELECTRIC CONNECTOR FIXING DEVICE

[75] Inventors: Ching-Ho Lai, Tao-Yuan Hsien; Wen-Chun Pei, Taipei, both of Taiwan

[73] Assignee: Hon Hai Precision Ind. Co., Ltd., Taipei Hsien, Taiwan

[21] Appl. No.: 08/949,045

[22] Filed: Oct. 10, 1997

[30] Foreign Application Priority Data

Oct. 18, 1996 [TW] Taiwan .................................. 85216149

[51] Int. Cl.[7] .................................................. H01R 13/73
[52] U.S. Cl. ........................... 439/573; 439/564; 411/182
[58] Field of Search ................................... 439/572, 573, 439/564; 411/182, 913, 103, 120

[56] References Cited

U.S. PATENT DOCUMENTS

| | | | |
|---|---|---|---|
| 4,624,585 | 11/1986 | Nix et al. ................................ | 411/182 |
| 4,750,878 | 6/1988 | Nix et al. ................................ | 411/182 |
| 5,616,052 | 4/1997 | Pan et al. ................................ | 439/564 |

*Primary Examiner*—Paula Bradley
*Assistant Examiner*—Katrina Davis

[57] ABSTRACT

A device for fixing an electric connector to a mother board is disclosed. The device includes a mounting flange integrally formed at a bottom corner of the electric connector, a nut having a hexagonal head portion and a neck portion, and a bolt. The mounting flange defines a nut receiving hole having a hexagonal hole portion and forms a locking tooth extending into the nut receiving hole. When the nut is pressed into the nut receiving hole to reach a position in which the hexagonal head portion fits the hexagonal hole portion, the nut is fixedly locked in position by the locking tooth engaging with the neck portion of the nut. The bolt extends from a bottom through the mother board to threadedly engage with the nut fixedly received in the nut receiving hole to firmly fix the connector to the mother board.

20 Claims, 6 Drawing Sheets

ELECTRIC CONNECTOR FIXING DEVICE

BACKGROUND OF THE INVENTION

1. Field of the Invention

The present invention relates to an electric connector fixing device, particularly to a device for fixing a card edge connector to a mother board.

2. The Prior Art

FIGS. 1 and 2 show a prior art card edge connector 1 for connecting a daughter board 2 to a mother board 3. The connector 1 comprises a frame 10 having a base (not labeled) and two upright side arms 13. The base defines a central slot 11 and has a number of contacts 12 mounted therein and located beside the slot 11. Each side arm 13 is formed with a pair of projections 14 defining a guiding groove 15 therebetween. To mount the daughter board 2 to the connector 1, two lateral edges (not labeled) of the daughter board 2 are received within the grooves 15 and moved in a direction indicated by arrow "A" to reach a position in which circuit pads (not shown) formed on a lower edge of the daughter board 2 are mechanically and electrically connected with the contacts 12.

Following the development of electronic technology, an increasing number of components are attached to the daughter board 2, which causes the daughter board 2 to become heavier. In order to firmly connect the daughter board 2 to the mother board 3, as shown in FIGS. 1 and 2, prior art proposed to integrally form four mounting flanges 16 at four corners of the frame 10. Each mounting flange 16 defines an upper hexagonal recess 18 communicating with a lower through hole (not shown). The hexagonal recess 18 matingly receives a hexagonal nut 20. Four bolts 30 extend from a bottom through the mother board 3 and the through holes defined by the mounting flanges 16 to threadedly engage with the nuts 20 received in the recesses 18 to fixedly connect the mother board 3 and the electric connector 1.

However, the prior art for fixing the connector 1 to the mother board 3 has the following disadvantages:

Before the nuts 20 are threadedly engaged with the bolts 30, the nuts 20 received in the recesses 18 are not fixed in position, which may cause the nuts 20 to become dislodged from the recesses 18 when the connector 1 is subject to a vibration or inclination. During such an occurrence, the mounting of the connector 1 to the mother board 3 may be disrupted.

Secondly, when bringing the bolts 30 to threadedly engage with the nuts 20 to assemble the connector 1 with the mother board 3, an assembler must use a hand or tool to press the nuts 20 in the recesses 18 to facilitate the engagement between the bolts 30 and the nuts 20 and ensure that the nuts 20 are entirely fitted in the recesses 18 after assembly. This causes an inconvenience during assembly and hinders assembly speed.

Finally, no mating arrangement exists between the mounting flanges 16 defining the recesses 18 and the nuts 20 which can provide a secure engagement therebetween to ensure that the connector 1 is firmly connected to the mother board 3 after the bolts 30 are extended through the mother board 3 and threadedly engage with the nuts 20.

Hence, there is a need for a connector fixing device to eliminate the above-mentioned defects of the current device for fixing a connector to a mother board.

SUMMARY OF THE INVENTION

Accordingly, an objective of the present invention is to provide a connector fixing device which includes a mounting flange integrally formed with a connector frame and defining a nut receiving hole, a nut which is located in position in the nut receiving hole after it is pressed thereinto and a bolt for extending through a mother board to threadedly engage with the nut received in the nut mounting hole to fix the connector to the mother board.

Another objective of the present invention is to provide a connector fixing device which includes a mounting flange integrally formed with a connector frame and defining a nut receiving hole, a nut to be received in the hole and a bolt for extending through a mother board to threadedly engage with the nut to fixedly connect the mother board and the connector. When extending the bolt through the mother board to threadedly engage with the nut to assemble the connector with the mother board, an assembler does not need to use a hand or tool to press the nut in the hole to facilitate the engagement between the bolt and the nut and ensure that the nut is entirely fitted in the nut receiving hole after assembly.

Still another objective of the present invention is to provide a connector fixing device which includes a mounting flange integrally formed with a connector frame and defining a nut receiving hole, a nut to be received in the nut receiving hole and a bolt for extending through a mother board to threadedly engage with the nut to fixedly connect the mother board and the connector. A number of teeth are formed on an inner periphery of the nut receiving hole defined by the mounting flange to compress a neck portion of the nut to ensure a secure engagement therebetween, whereby after the bolt is extended through the mother board to threadedly engage with the nut, the connector can be firmly connected to the mother board.

To fulfill the above-mentioned objectives, according to an aspect of the present invention, a connector fixing device is disclosed. The connector fixing device includes a mounting flange integrally formed with a frame of the connector for receiving a daughter board, a nut and a bolt. The mounting flange defines a nut receiving hole having an upper hexagonal hole portion, a middle round hole portion having a diameter smaller than a width of the hexagonal hole portion and defining an upper step therewith, and a lower round hole portion having a diameter smaller than that of the middle round hole. Locking teeth are formed on an inner periphery of the middle round hole portion defined by the mounting flange and extend toward a center thereof. Each tooth defines an arced top face. The nut is formed to have a hexagonal head portion, a middle neck portion and a lower truncated cone portion. When the nut is pressed into the nut receiving hole, a bottom face of the hexagonal head portion of the nut abuts the upper step of the nut receiving hole and a top face of the truncated cone portion of the nut abuts a bottom face of each of the teeth, whereby the nut is fixedly received in the nut receiving hole. The bolt is brought to extend from a bottom through the mother board to threadedly engage with the nut to firmly fix the connector to the mother board.

DETAILED DESCRIPTION OF THE PREFERRED EMBODIMENTS

Figure 1:
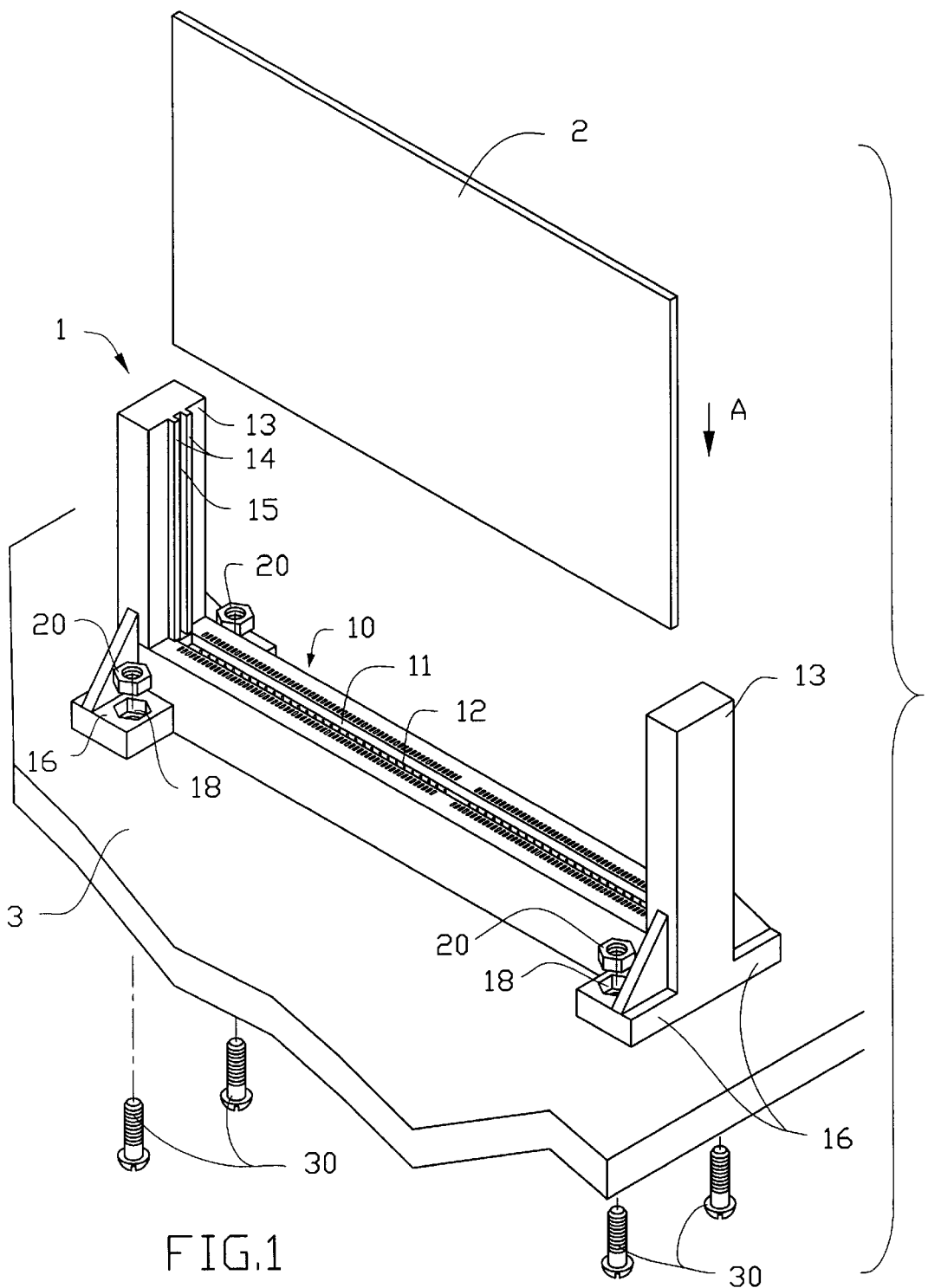
FIG. 1 is a perspective, exploded view showing a prior art device for fixing a card edge connector to a mother board.
Figure 2:
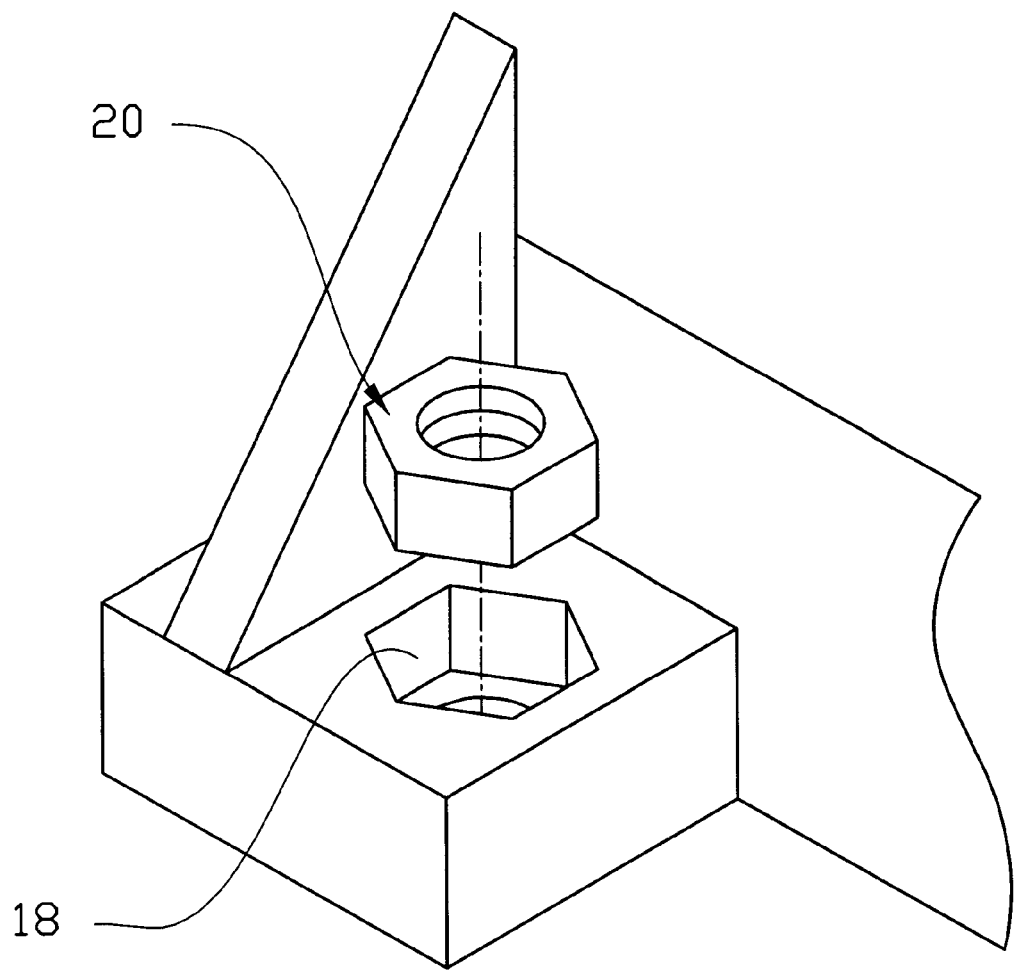
FIG. 2 is a partially enlarged view of FIG. 1, showing a mounting flange of the connector defining a hexagonal recess and a hexagonal nut.
Figure 3:
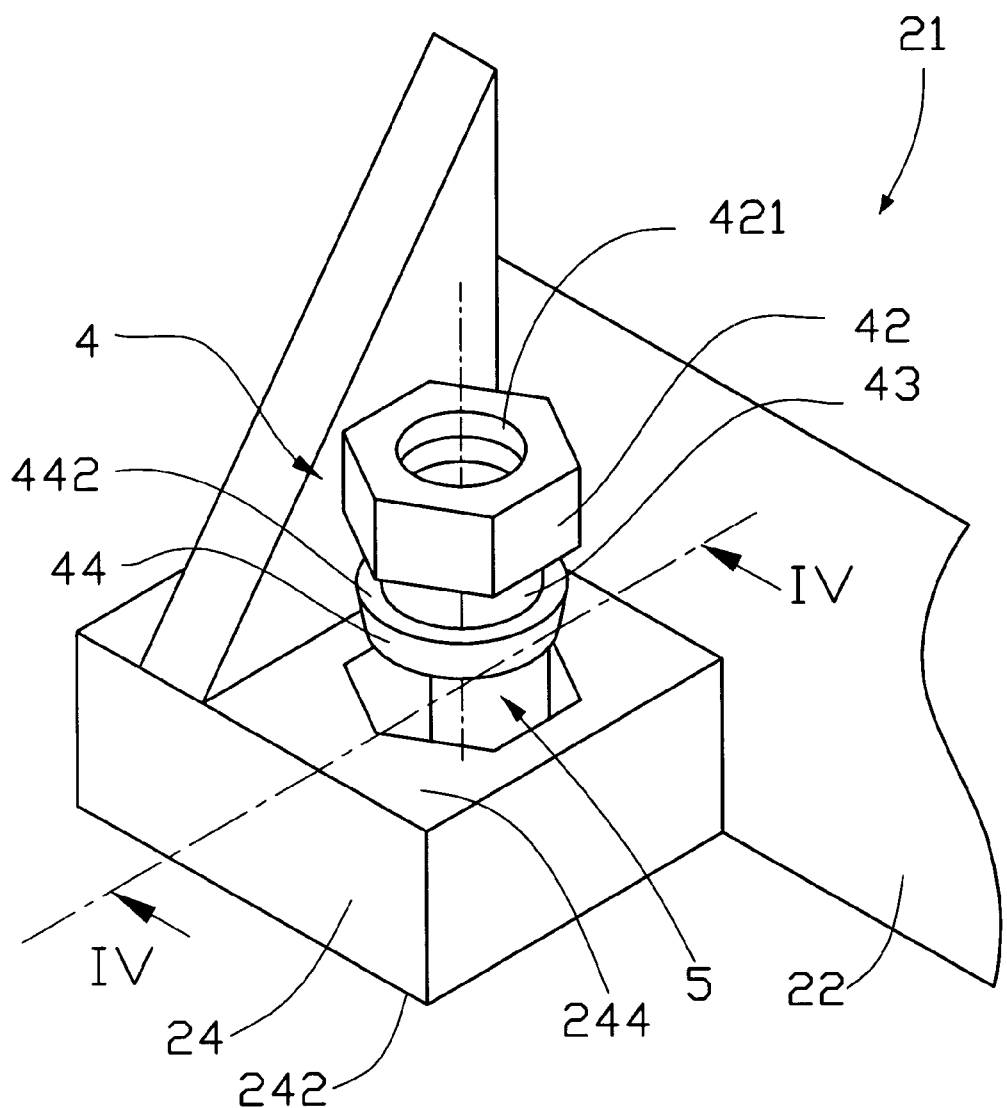
FIG. 3 is a partially enlarged view showing a mounting flange and a nut in accordance with the present invention, wherein the mounting flange is integrally formed with a frame of a card edge connector and defines a nut receiving hole having a hexagonal hole portion about a top face of the mounting flange.
Figure 4:
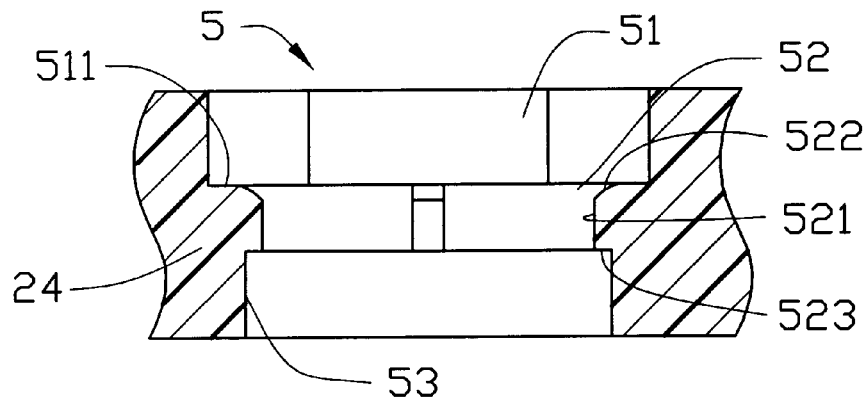
FIG. 4 is a partially cross-sectional view taken along line IV—IV of FIG. 3 to show a detailed configuration of the nut receiving hole.
Figure 5:
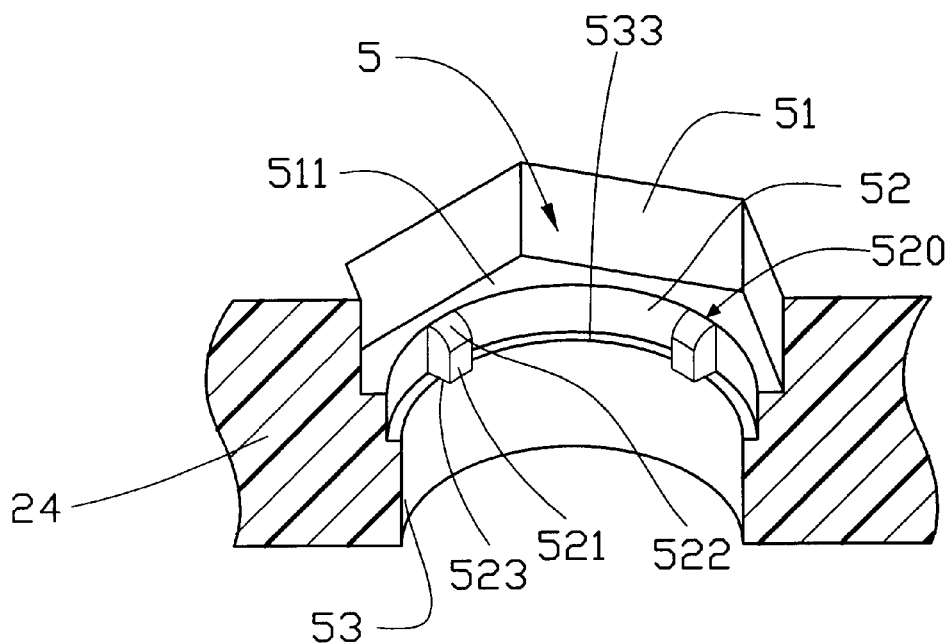
FIG. 5 is a partially perspective, cross-sectional view showing the detailed configuration of the nut receiving hole from a viewing angle different from that of FIG. 4.
Figure 6:
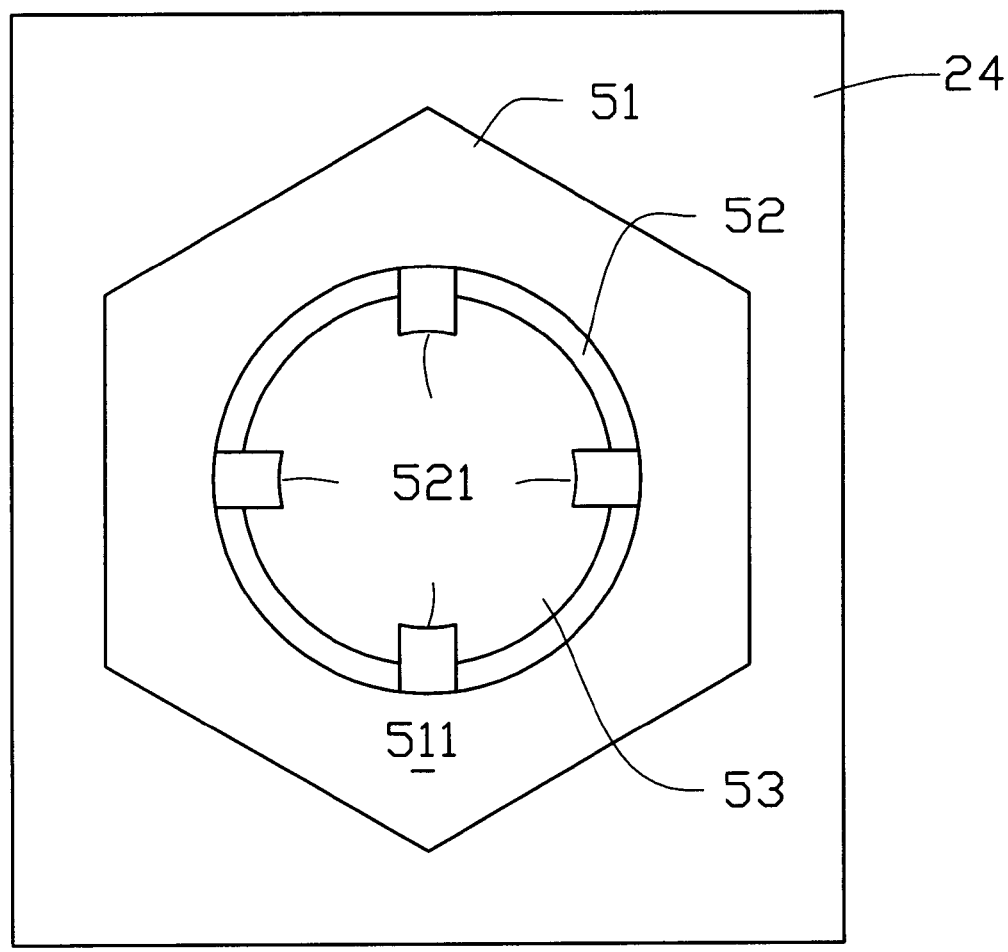
FIG. 6 is a top plane view of the nut receiving hole defined in the mounting flange.

Referring to FIGS. 3 to 7, a device in accordance with the present invention for fixing a connector, particularly a card edge connector 21 (only partly shown) to a mother board 3, includes a mounting flange 24 integrally formed with a frame 22 (only partly shown) of the connector 21 and defining a nut receiving hole 5, a nut 4 and a bolt 30, wherein the bolt 30 has a structure similar to the prior art bolt. The mounting flange 24 has a bottom face 242 for attachment to the mother board 3 and a top face 244 on a side opposite the bottom face 242.

The nut 4 defines a central screw hole 421. Furthermore, the outer profile of the nut 4 can be divided into three portions: an upper head portion 42, a middle neck portion 43 and a lower truncated cone portion 44. The head portion 42 has a hexagonal configuration. The neck portion 43 has a cylindrical configuration and forms a first step 422 with the head portion 42 (better seen in FIG. 7). The truncated cone portion 44 tapers toward a bottom end of the nut 4 and forms a second step 442 with the neck portion 43.

The nut receiving hole 5 is also defined with three portions: an upper hexagonal hole portion 51 located about the top face 244 of the mounting flange 24, a middle round hole portion 52 having a diameter smaller than a width of the hexagonal hole portion 51 and a lower round hole portion 53 having a diameter smaller than that of the middle round hole portion 52. An upper step 511 is formed between the hexagonal hole portion 51 and the middle round hole portion 52, and a lower step 533 is formed between the middle and lower round hole portions 52, 53 (better seen in FIG. 5).

The mounting flange 24 is further integrally formed with four locking teeth 520 equidistantly extending from an inner periphery of the middle round hole portion 52 defined by the mounting flange 24 toward a center thereof. Each tooth 520 is configured to have an arced top face 522 extending from the upper step 511 downward toward the center of the middle hole portion 52, a free end face 521 vertically extending downward from the arced top face 522, and a bottom face 523 horizontally extending from the lower step 533 to the free end face 521.

To fix the connector 21 to the mother board 3, firstly, the nut 4 is brought to be pressed into the nut receiving hole 5 by first bringing the bottom end of the nut 4 into the hole 5 from the hexagonal hole portion 51 to reach a position in which the nut 4 is fixedly locked in the hole 5, for which detailed descriptions are given below.

Figure 7:
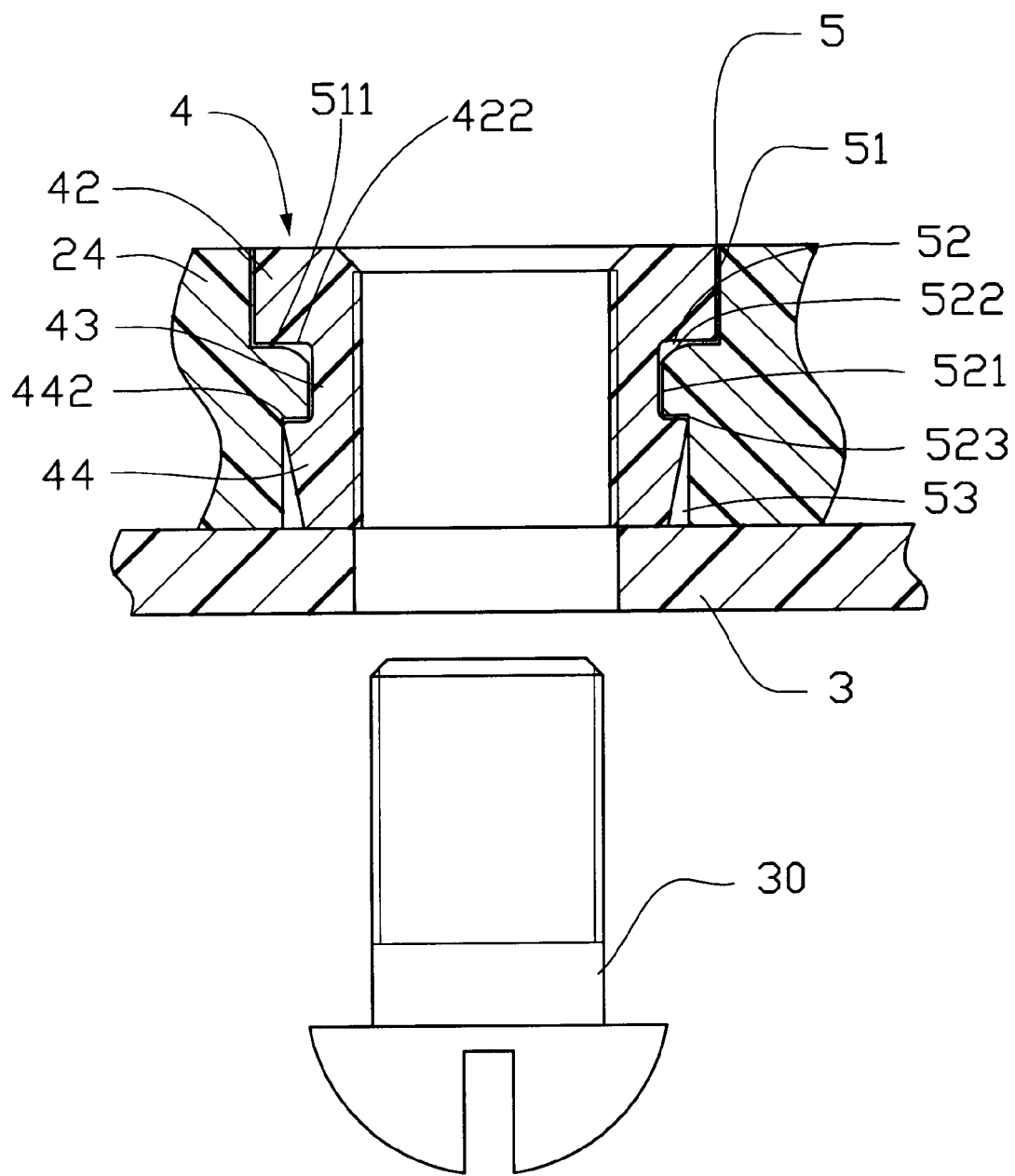
FIG. 7 is a view similar to FIG. 4, but shows a nut inserted in the nut receiving hole and a bolt prepared to be extended from a bottom through a mother board to threadedly engage with the nut.

During the pressing process of the nut 4 into the hole 5, the truncated cone portion 44 will firstly press the locking teeth 520 and cause a deformation thereof. Since the mounting flange 24 is made of plastic which has a certain degree of elasticity, the deformation thereof is only temporary. Furthermore, due to the mating configuration between the arced top faces 522 of the teeth 520 and the lower truncated cone portion 44 of the nut 4, the arced top faces 522 and the free end face 521 will not hinder the movement of the lower truncated cone portion 44 therethrough to reach a locked position as shown in FIG. 7. In the locked position, the first step 422 of the nut 4 abuts the upper step 511 of the nut receiving hole 5, and the second step 442 of the nut 4 abuts the bottom faces 523 of the teeth 520, whereby the nut 4 is locked in the nut receiving hole 5 and can not be moved upward nor downward from the locked position. Finally, the bolt 30 is brought to extend from a bottom through the mother board 3 to threadedly engage with the nut 4 to fix the connector 21 to the mother board 3.

By the present invention, when the nut 4 is pressed into the hole 5, the nut 4 is locked in the hole 5. Thus, before the bolt 30 is extended into the hole 5 to engage with the nut 4, the nut 4 can not be moved from the hole 5, even when the connector 21 is subjected to a vibration or inclination. Furthermore, since the nut 4 is locked in the hole 5, when bringing the bolt 30 to threadedly engage with the nut 4 to assemble the connector 21 with the mother board 3, an assembler does not need to use a hand or tool to press the nut 4 in the hole 5 to facilitate the engagement between the bolt 30 and the nut 4 and ensure that the nut 4 is entirely fitted in the hole 5 after assembly.

Although it is not shown in the drawings, in a further embodiment of the present invention the neck portion 43 of the nut 3 and the teeth 520 of the mounting flange 24 can be so dimensioned that when nut 4 is received in the locked position of the nut receiving hole 5, the teeth 520 are interferentially fitted with the neck portion 43 to exert a compression thereon, whereby the nut 4 and the mounting flange 24 can be securely connected; thus, when the bolt 30 is extended through the mother board 3 to threadedly engage with the nut 4, the bolt 30 can firmly fix the connector 21 to the mother board 3.

It is known by those skilled in the art that the locking device in accordance with the present invention can not only be used to fix a connector to a mother board, but also can be used in other applications for fixing a first part to a second part provided that the first part is attached with the mounting flange 24 formed with the nut receiving hole 5 fitted with the nut 4, and the bolt 30 is extended from a bottom through the second part to threadedly engage with the nut 4. Thus, such other applications are also within the scope of the present invention.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

It is claimed that:

1. A device for fixing an electric connector to a mother board, said connector comprising a frame for receiving a daughter board, said device comprising:

a mounting block for connection to the frame of the connector, said mounting block having a bottom face for attachment to the mother board and a top face on a side opposite the bottom face, said mounting block defining a nut receiving hole through the top and bottom faces and having a hole portion about the top face;

a nut defining a screw hole extending substantially therethrough and forming a head portion;

locating means is a tooth formed on an inner periphery of the nut receiving hole defined by the mounting block and extending toward a center of the nut receiving hole for fixedly locking the nut in the nut receiving hole when the nut is pressed into the nut receiving hole by extending a bottom end of the nut opposite the head portion into the nut receiving hole from the top face of the mounting block to reach a locking position in which the head portion of the nut fits the mounting block defining the hole portion; and fastening means for extending through the mother board to threadedly engage with the nut fixedly locked in the nut receiving hole to fix the connector to the mother board.

2. The device in accordance with claim 1, wherein the nut has a neck portion below the head portion and a lower portion below the neck portion, the neck portion having a width which is smaller than either of the head and lower portions, the tooth engaging with the neck portion when the nut is pressed into the nut receiving hole to reach the locked position.

3. The device in accordance with claim 2, wherein the nut receiving hole has a first round hole portion located below the hole portion and having a diameter smaller than a width of the hole portion to form an upper step with the hole portion, the tooth being formed on the inner periphery of the first round hole portion defined by the mounting block.

4. The device in accordance with claim 3, wherein the head portion of the nut forms a first step with the neck portion, said first step abutting the upper step, and wherein the lower portion of the nut forms a second step with the neck portion, said second step abutting a bottom face of the tooth.

5. The device in accordance with claim 4, wherein the nut receiving hole comprises a second round hole portion below the first round hole portion and having a diameter smaller than that of the first round hole portion to form a lower step therewith, the bottom face of the tooth horizontally extends from the lower step to connect with the free end face of the tooth.

6. The device in accordance with claim 4, wherein the tooth has an arced top face extending from the inner periphery of the first round hole portion defined by the mounting block downward to a free end face of the tooth, and the lower portion of the nut is a truncated cone tapering toward the bottom end of the nut.

7. The device in accordance with claim 6, wherein the arced top face of the tooth extends downward from the upper step.

8. An assembly of an electrical connector and a mother board, comprising:

an electrical connector, comprising:

a frame having an elongated base defining a slot and having a number of contacts mounted to the base and located beside the slot, two arms extending upright from two lateral ends of the base, each arm defining a guiding groove for guiding a daughter board to be mounted into the frame to mechanically and electrically connect with the contacts, and a mounting flange in the form of a block being integrally formed at a corner of the base and one of the arms, the mounting flange comprising:

a bottom face, a top face on a side opposite the bottom face, and a nut receiving hole defined through the top and bottom faces and having a hole portion about the top face;

a nut received in the nut receiving hole and defining a screw hole extending substantially therethrough and including a head portion fitted with the hole portion;

locating means is a tooth formed on an inner periphery of the nut receiving hole defined by the mounting flange for fixedly locking the nut in the nut receiving hole and exerting a compressing force on the nut;

a mother board having a top face in contact with the bottom face of the mounting flange and a bottom face on a side opposite the top face of the mother board; and a bolt extending from the bottom face of the mother board through the mother board to threadedly engage with the nut fixedly locked in the nut receiving hole to exert a compressing force on the mother board against the mounting flange whereby the electric connector is firmly fixed to the mother board.

9. The assembly in accordance with claim 8, wherein the locating means comprises two teeth integrally formed on the inner periphery of the nut receiving hole defined by the mounting flange, extending toward a center of the nut receiving hole and located opposite each other.

10. The assembly in accordance with claim 9, wherein the nut has a neck portion below the head portion and a lower portion below the neck portion, the neck portion having a width which is smaller than either of the head and lower portions, the teeth compressing the neck portion.

11. The assembly in accordance with claim 10, wherein the nut receiving hole has a first round hole portion located below the hole portion and having a diameter smaller than a width of the hole portion to form an upper step with the hole portion, the teeth being formed on an inner periphery of the first round hole portion defined by the mounting flange.

12. The assembly in accordance with claim 11, wherein the head portion of the nut forms a first step with the neck portion, said first step abutting the upper step.

13. The assembly in accordance with claim 12, wherein each of the teeth has an arced top face extending from the inner periphery of the first round hole portion defined by the mounting flange downward to a free end face of the tooth, and the lower portion of the nut is a truncated cone tapering toward a bottom end of the nut.

14. The assembly in accordance with claim 13, wherein the arced top face of the tooth extends downward from the upper step.

15. The assembly in accordance with claim 13, wherein the lower portion of the nut forms a second step with the neck portion and the tooth has a bottom face abutting the second step.

16. The assembly in accordance with claim 15, wherein the nut receiving hole comprises a second round hole portion below the first round hole portion and having a diameter smaller than that of the first round hole portion to form a lower step therewith, the bottom face of the tooth horizontally extends from the lower step to connect with the free end face of the tooth.

17. A combination of a nut with a threaded hole extending substantially therethrough and a mounting member made of elastic material in form of a block for fixing a first part in connection with the mounting member to a second part by extending a fastening element through the second part to threadedly engage with the nut, the nut comprising a head portion, a neck portion below the head portion and a lower portion located below the neck portion and having a truncated cone configuration tapering toward a bottom end of the nut, the neck portion having a width which is smaller than either of the head and lower portions, the mounting member having a top face, a bottom face and a hole defined therethrough, the hole comprising a hole portion, a first round hole portion below the hole portion and having a diameter smaller than a width of the hole portion to define a first step therewith, a tooth extending from the first round hole portion toward a center thereof, said tooth having an arced top face and a flat bottom face, the arced top face extending downward and the flat bottom face extending horizontally from the first round hole portion to connect with a free end face of the tooth, wherein:

the head portion is fitted with the hole portion, a bottom of the head portion abuts the first step, the free end face engages with the neck portion and a top of the lower portion of the nut abuts the bottom face of the tooth.

18. The combination in accordance with claim 17, wherein the arced top face of the tooth extends downward from the first step.

19. The combination in accordance with claim 17, wherein the hole is further defined with a second round hole portion located below the first round hole portion and having a diameter smaller than that of the first round hole portion to define a second step therewith, the bottom face of the tooth extending from the second step.

20. A mechanism for retaining a screw nut within a screw nut receiving hole of a mounting piece in the form of a block, said screw nut including a threaded hole extending substantially therethrough, a head portion, a cone portion and a neck portion between the head-and cone portions, a plurality of locking teeth radially projecting inward from a periphery of the receiving hole whereby said locking teeth engage with the neck portion to prevent the screw from upward and downward movement relative to the nut receiving hole, the head portion being fitted within a portion of the screw nut receiving hole to prevent the screw nut from pivotable movement relative to the nut receiving hole.

\* \* \* \* \*